United States Patent
Kamijoh et al.

(10) Patent No.: US 7,034,990 B2
(45) Date of Patent: Apr. 25, 2006

(54) WAVELENGTH CONVERSION ELEMENT AND METHOD FOR USING SAME

(75) Inventors: Takeshi Kamijoh, Tokyo (JP); Chang-qing Xu, Hamilton (CA)

(73) Assignee: Oki Electric Industry Co., Ltd., Tokyo (JP)

(*) Notice: Subject to any disclaimer, the term of this patent is extended or adjusted under 35 U.S.C. 154(b) by 23 days.

(21) Appl. No.: 10/925,011

(22) Filed: Aug. 25, 2004

(65) Prior Publication Data

US 2005/0105163 A1 May 19, 2005

(30) Foreign Application Priority Data

Aug. 26, 2003 (JP) ............... 2003-301475

(51) Int. Cl.
*G02F 1/35* (2006.01)
*G02F 1/39* (2006.01)

(52) U.S. Cl. ........................ 359/326; 359/330
(58) Field of Classification Search ......... 359/326–332
See application file for complete search history.

(56) References Cited

U.S. PATENT DOCUMENTS 5,285,508 A * 2/1994 Chikuma .................. 385/30
6,653,630 B1 * 11/2003 Rosenman et al. ......... 250/306

OTHER PUBLICATIONS

"1.5 μm band efficient broadband wavelength conversion by difference frequency generation in a periodically domain-inverted LiNbO₃ channel waveguide", C.Q. Xu et al., Appl. Phys. Lett. 63(26), Dec. 27, 1993, p. 3559.

"1.5-μm-Band Wavelength Conversion Based on Cascaded Second-Order Nonlinearity in LiNbO₃ Waveguides", M.H. Chou et al., IEEE Photonics Technology Letters, vol. 11, No. 6, Jun. 1999, p. 653.

* cited by examiner

*Primary Examiner*—John D. Lee
(74) *Attorney, Agent, or Firm*—Venable, LLP; James R. Burdett (57) ABSTRACT

A wavelength conversion element which can set the wavelength of a pump light to a wavelength longer or shorter than the wavelength of a plurality of signal lights and a wavelength of a plurality of conversion lights present in an optical communication band, and a method for using such a wavelength conversion element are provided. A first pump light with a wavelength $\lambda_1$ of 1.51 μm, a second pump light with a wavelength $\lambda_2$ of 1.57 μm, and a signal light with a wavelength of $\lambda_S$ of 1.55 μm are multiplexed in a multiplexer and introduced as an incident light into an optical waveguide of a wavelength conversion element. In the optical waveguide, an SF light with a wavelength $\lambda_{SF}$ of 0.77 μm is generated by the SFG of the first pump light with a wavelength $\lambda_1$ of 1.51 μm and the second pump light with a wavelength $\lambda_2$ of 1.57 μm, the signal light is wavelength converted as a DF light (wavelength 1.53 μm) by the DFG of the SF light and signal light, and this DF light is outputted as the converted light (wavelength $\lambda_C$=1.53 μm).

6 Claims, 7 Drawing Sheets

WAVELENGTH CONVERSION ELEMENT AND METHOD FOR USING SAME

BACKGROUND OF THE INVENTION

1. Field of the Invention

The present invention relates to a wavelength conversion element used in wavelength division multiplexing optical communication or the like, and a method for using such a wavelength conversion element.

2. Description of Related Art

A variety of means for constructing a large-capacity optical communication network with a transmission speed of 1 Tbit/s or higher have been studied, and among them the wavelength division multiplexing (WDM) technology has attracted most attention. Wavelength conversion devices are necessary for realizing the WDM optical communication network.

For example, if a wavelength conversion device is employed in an optical cross-connect node, then collisions between channels are avoided and wavelength can be reused. Other advantages include easy network control and network modification (upgrade), which makes it possible to use new communication bands.

Quasi-phase matching (QPM) wavelength conversion elements (sometimes referred to hereinbelow as "QPM-type wavelength conversion elements") which are the elements using an optical waveguide and in which wavelength conversion is carried out by realizing the QPM with a periodic domain inversion structure formed in the optical waveguide are used as elements constituting the aforementioned wavelength conversion devices. The optical waveguide is used because light propagating in the optical waveguide can propagate through a necessary distance, while maintaining a high energy density thereof. An optical waveguide formed in a QPM-type wavelength conversion element will be sometimes referred to hereinbelow as a QPM optical waveguide.

The periodic domain inversion structure is a structure composed by periodically arranging a plurality of domains with reversal spontaneous polarization of ferroelectrics, as described hereinbelow. This is why it is also called a periodic polarization reversal structure.

Here, for convenience of explanation, a light serving as a carrier wave which carries a signal that has to be transmitted in optical communication will be called a signal light, a light used for nonlinearly interacting with the signal light and converting the wavelength of the signal light will be called a pump light, and a signal light with the converted wavelength will be called a converted light.

The higher is the energy density of nonlinearly interacting lights (for example, a signal light and a pump light) and the longer is the length of nonlinear interaction (interaction length) the stronger are the nonlinear optical effects. Thus, producing a structure in which a nonlinear optical effect is realized in a waveguide in which light can propagate through the necessary distance, while maintaining a high energy density thereof, is effective for increasing the intensity of nonlinear optical effects.

Further, it is also effective to design the nonlinearly interacting lights (for example, a signal light and a pump light) so that they together can be coupled into the QPM waveguide efficiently, and propagate in an optical waveguide in a lowest order mode (fundamental mode). For this purpose, it is desired that the wavelengths of the nonlinearly interacting lights be almost equal. This is because that the optical coupling conditions depend on the wavelength of the light to be coupled into the waveguide, and a light with too shorter wavelength may not to be guided in a lowest order mode if the waveguide is designed as a single mode waveguide for a light with longer wavelength.

An example of the conventional wavelength conversion element of the above-described type is described below.

A method was suggested (see, for example, C. Q. Xu, et al. Appl. Phys. Let. Vol.63, p.3559 (1993)) for converting the wavelength of a signal light by difference frequency generation (DFG) using a QPM-wavelength conversion element in which a periodic domain inversion structure is formed in an optical waveguide. Thus, difference frequency generation of a plump light and signal light is induced, and the differential frequency light obtained thereby (sometimes referred to hereinbelow as "DF light") becomes a converted light. The wavelength of the pump light used in such wavelength conversion is about half of the wavelength of the signal light or the wavelength of the converted light.

Further, a method for conducting wavelength conversion of a signal light by using a QPM-type wavelength conversion element in which a periodic domain inversion structure formed in an optical waveguide and realizing secondary nonlinear optical effects in a cascade manner has also been reported (see, for example, M. H. Chou, et al. IEEE Photonic Tech. Lett. Vol.11, p.653 (1999)). Thus, with this method, a pump light is used as a basic wavelength light and this light is wavelength converted into a second harmonic light (sometimes referred to hereinbelow as "SH light") with a wavelength half that of the basic light by second harmonic generation (SHG). Further, there is a method for converting a signal light into a converted light (DF light) having a new wavelength by simultaneous DFG of the second harmonic light with a half wavelength and the signal light. In this wavelength conversion, the wavelength of the pump light is almost equal to the wavelength of the signal light and the wavelength of the converted light (DF light).

In order to explain the problems which are to be resolved by the present invention, first, the structure of the QPM-type wavelength conversion element and the operation principle thereof will be described with reference to the conventional wavelength conversion technology.

Figure 1:
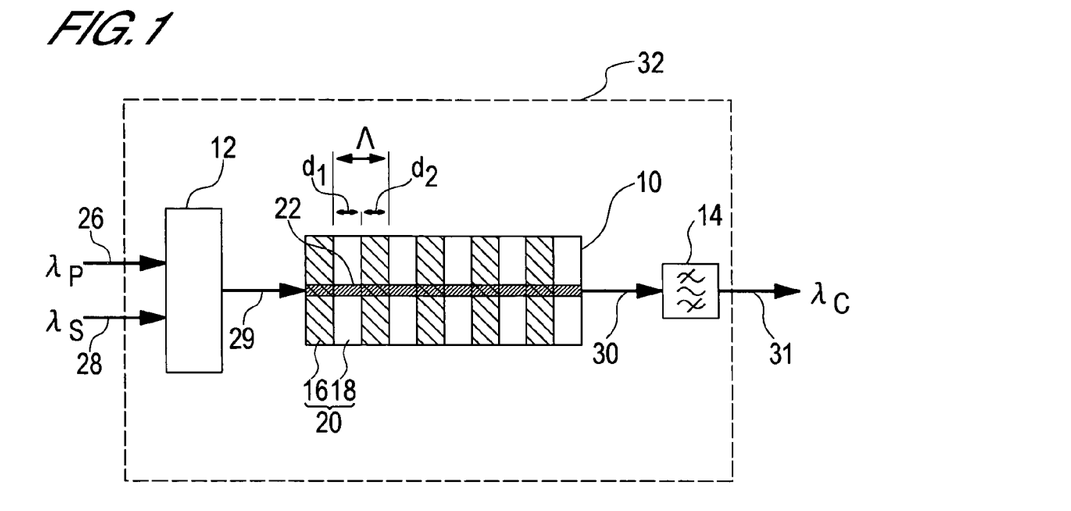
FIG. 1 is a schematic model employed for explaining the wavelength conversion device realizing wavelength conversion with the DFG.

A method for converting the wavelength of a signal light by the DFG will be described below with reference to FIG. 1. FIG. 1 is a schematic model employed for explaining a conventional wavelength conversion device 32 composed by using a wavelength conversion element 10, a multiplexer 12, and a narrow-band wavelength filter 14. In this model hatching is used in respective places to display the presence of an optical waveguide or domain. Therefore, this hatching does not mean the cross-sectional shape of a three-dimensional structure. Further, similarly to FIG. 1, in FIG. 3 which will be referred to in subsequent explanation, hatching is employed for the same purpose, and this hatching, too, does not mean the cross-sectional shape of a three-dimensional structure.

The wavelength conversion element 10 used for such wavelength conversion is a QPM-type wavelength conversion element in which a periodic domain inversion structure 20 was created in the optical waveguide 22. The mechanism of wavelength conversion involves conducting the DFG of a pump light (wavelength $\lambda_p$) and a signal light (wavelength $\lambda_s$), and employing the DF light thus obtained as a converted light ($\lambda_c$).

Prior to explaining the operation principle of the wavelength conversion element 10, a method for forming the wavelength conversion element 10 will be explained. A method for forming the wavelength conversion element 10 that will be explained hereinbelow is applicable not only to the wavelength conversion element 10 in which the wavelength of the signal light is converted by the DFG, but also to the formation of a similar wavelength conversion element based on the QPM.

<Method for Forming Wavelength Conversion Element>

The domain reversal structure 20 is composed of a first domain 16 and a second domain 18. In the first domain 16 and second domain 18, the directions of spontaneous polarization of ferroelectric crystals which are the base materials constituting the wavelength conversion element 10 are at an angle of 180° with respect to each other. For example, z-cut LiNbO$_3$ substrates can be used as the base materials constituting the wavelength conversion element. In the explanation provided hereinbelow, z-cut LiNbO$_3$ substrates will be considered as ferroelectric crystal substrates, unless stated otherwise.

Such z-cut LiNbO$_3$ substrates are single domain crystal structures in which the directions of spontaneous polarization are so arranged as to be perpendicular to the surface. The plane at the far end side of the spontaneous polarization vector is sometimes called a +z plane, and that at the base end side of the spontaneous polarization vector is sometimes called a −z plane.

The domain reversal region (second domain) 18 is formed by reversing the domain periodically in the +z plane of the LiNbO$_3$ substrate. Therefore, the periodic domain inversion region 20 is composed of the domain (first domain 16) where the spontaneous polarization of the single domain crystal substrate is maintained and the domain (second domain 18) where the direction of spontaneous polarization was reversed. Thus, the direction of spontaneous polarization of the first domain 16 is the direction from the −z plane to the +z plane, whereas the direction of spontaneous polarization of the second domain 18 is from the +z plane to the −z plane.

The period of the periodic structure formed by the first domain 16 and second domain 18 is Λ. The wavelength conversion efficiency can be maximized by making the size $d_1$ of the first domain 16 equal to the size $d_2$ of the second domain 18. Thus, it is preferred that $d_1=d_2$ and $Λ=d_1+d_2$.

It is well known that in order to form the region with reversed direction of spontaneous polarization, either Ti is high-temperature thermally diffused into the region where the direction of spontaneous polarization of the z-cut LiNbO$_3$ substrate is to be reversed or a high voltage is applied to this region. In order to conduct high-temperature thermal diffusion of Ti, a Ti thin film may be formed to a thickness of 50 nm by a vacuum deposition method or the like on the portion where the second domain 18 will be formed and then thermal diffusion may be conducted for 10 hours at a temperature of 1000° C. In order to reverse the direction of spontaneous polarization by applying a high voltage, an electrode may formed on the portion where the domain 18 is to be formed and a high voltage may be applied instantaneously.

Then, an optical waveguide 22 is so formed as to cross the periodic domain inversion structure formed in the z-cut LiNbO$_3$ substrate. It is well-known that the optical waveguide can be formed by a H$^+$—Li$^+$ ion exchange method (also called a proton exchange method) in which benzoic acid serves as an exchange source. For example, an optical waveguide can be formed by coating the entire region with a metal mask, while leaving only the region where the optical waveguide 22 is to be formed, immersing for 2 hours in benzoic acid at a temperature of 200° C., removing the metal mask and benzoic acid, and conducting annealing for 6 hours in wet O$_2$ atmosphere at a temperature of 350° C.

<Operation Principle of Wavelength Conversion Element>

The operation principle of a wavelength conversion element for converting the wavelength of a signal light by the DFG will be described with reference to FIG. 1. A pump light 26 with a wavelength $λ_p$ of 0.77 μm and a signal light 28 with a wavelength $λ_s$ of 1.55 μm are multiplexed in the multiplexer 12 and introduced as an incident light 29 into the QPM optical waveguide 22 of the wavelength conversion element 10. In the QPM optical waveguide 22, a DF light with a wavelength $λ_c$ of 1.53 μm is generated by the DFG of the pump light 26 and signal light 28. Therefore, a light obtained by multiplexing the pump light with a wavelength $λ_p$ of 0.77 μm, signal light 28 with a wavelength $λ_s$ of 1.55 μm, and DF light with a wavelength $λ_c$ of 1.53 μm are outputted as an outgoing light 30 from the QPM optical waveguide 22 of the wavelength conversion element 10.

Figure 2:
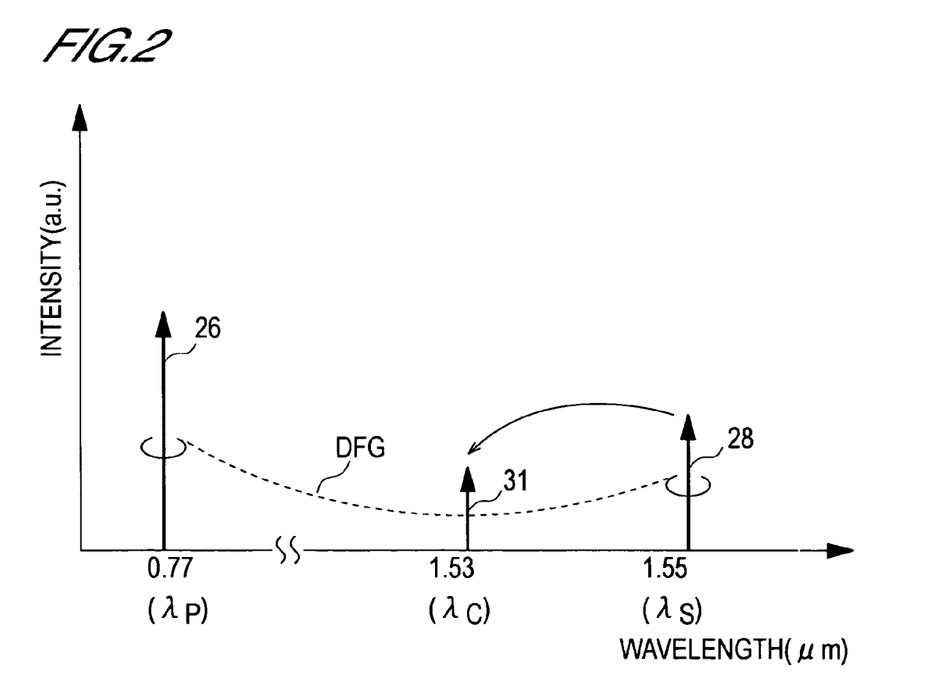
FIG. 2 illustrates the wavelength conversion process with the DFG.

The process of the above-described wavelength conversion will be described hereinbelow with reference to FIG. 2. In FIG. 2, a wavelength in micron units is plotted against the abscissa, and a light intensity is plotted in arbitrary units against the ordinate. The positions of the initial points of the arrows directed upward show wavelength center positions of the pump light (wavelength $λ_p$), signal light (wavelength $λ_s$), and DF light (converted light) with a wavelength $λ_c$, and the length of the arrows reflects the relative relationship by being proportional to respective light intensity.

The pump light 26 with a wavelength $λ_p$ of 0.77 μm and the signal light 28 with a wavelength $λ_s$ of 1.55 μm are shown in FIG. 2 by semicircular symbols and the broken line connecting them. This is a schematic representation of the relationship providing for the generation of the DF light with a wavelength $λ_c$ of 1.53 μm by a nonlinear interaction such as DFG of the pump light 26 and signal light 28. This result can be interpreted as a conversion of the signal light 28 with a wavelength $λ_s$ of 1.55 μm into a converted light with a wavelength $λ_c$ of 1.53 μm through the pump light 26 with a wavelength $λ_p$ of 0.77 μm.

The DF light which is a new light with a wavelength $λ_c$ of 1.53 μm is generated by introducing the pump light 26 with a wavelength $λ_p$ of 0.77 μm and the signal light 28 with a wavelength $λ_s$ of 1.55 μm into the wavelength conversion element 10. Therefore, the outgoing light 30 from the wavelength conversion element 10 becomes a light obtained by multiplexing the pump light 26 with a wavelength $λ_p$ of 0.77 μm, signal light 28 with a wavelength $λ_s$ of 1.55 μm, and DF light with a $λ_c$ of 1.53 μm.

The outgoing light 30 is filtered with a narrow-band wavelength filter 14 and only the DF light with a wavelength $λ_c$ of 1.53 μm is taken out as the converted light 31. Thus, the signal light 28 with a wavelength $λ_s$ of 1.55 μm is wavelength converted as the DF light with a wavelength $λ_c$ of 1.53 μm and converted into the converted light 31 with the wavelength conversion device 32 comprising the multiplexer 12, wavelength conversion element 10, and narrowband wavelength filter 14.

The wavelength $λ_p$ of the pump light used in this wavelength conversion is 0.77 μm and the wavelength $λ_s$ of the signal light is 1.55 μm. Therefore, the wavelength of the pump light is about half that of the signal light. However, as described hereinabove, it is very difficult to couple both the pump light and the signal light into the waveguide. For this reason, it is difficult to increase the efficiency of energy conversion from the signal light to the converted light. A method for conducting wavelength conversion of a signal light by inducing a cascade of secondary nonlinear optical effects was suggested. With this method, the wavelength of the pump light and the wavelength of the signal light can be made almost equal to each other.

Figure 3:
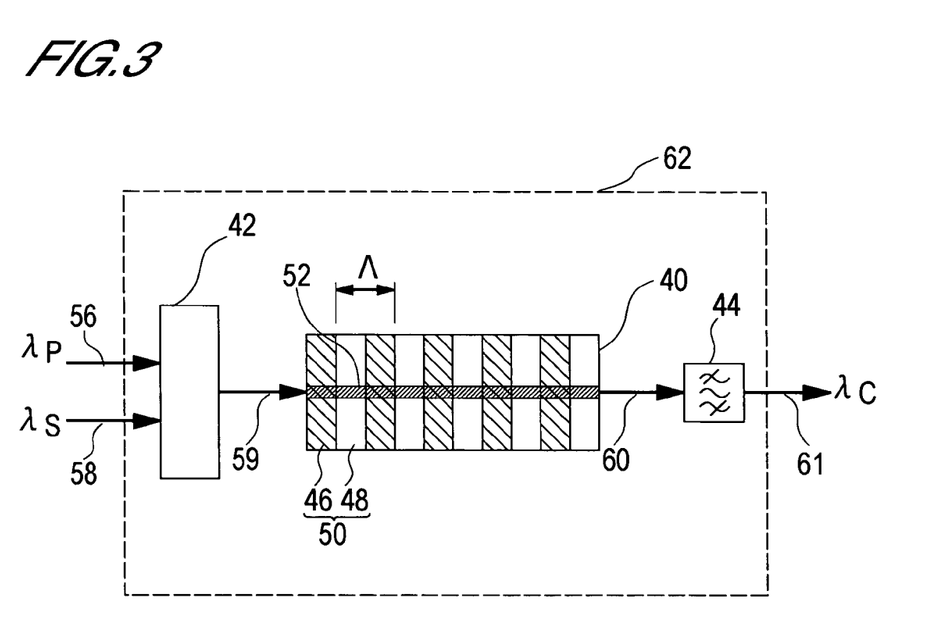
FIG. 3 is a schematic model employed for explaining the wavelength conversion device realizing wavelength conversion by demonstrating second order nonlinear optical effects in a cascade manner.

A method for conducting wavelength conversion of the signal light by inducing the aforementioned secondary nonlinear optical effects in a cascade manner will be described below with reference to FIG. 3. With this method the pump light is considered as the base wave light and the wavelength thereof is converted into a second harmonic light (SH light) with a wavelength half that of the pump light by the SHG. At the same time, the signal light is converted into a converted light (DF light) having a new wavelength by the DFG of the SH light and signal light.

The pump light 56 with a wavelength $\lambda_p$ of 1.54 µm and a signal light 58 with a wavelength $\lambda_s$ of 1.55 µm are multiplexed in a multiplexer 42 and introduced as an incident light 59 into a QPM optical waveguide 52 of a wavelength conversion element 40. In the QPM optical waveguide 52, an SH light (wavelength $\lambda_{SH}$ 0.77 µm) is generated by the SHG of the pump light 56 with a wavelength $\lambda_p$ of 1.54 µm, and a DF light with a wavelength $\lambda_c$ of 1.53 µm is generated by the DFG of the SH light and the signal light 58 with a wavelength $\lambda_s$ of 1.55 µm.

Therefore, a DF light with a wavelength $\lambda_c$ of 1.53 µm which is obtained by multiplexing the pump light with a wavelength $\lambda_p$ of 1.54 µm, signal light with a wavelength $\lambda_s$ of 1.55 µm, SH light with a wavelength $\lambda_{SH}$ of 0.77 µm, and DF light with a wavelength $\lambda_c$ of 1.53 µm is outputted as an outgoing light 60 from the QPM optical waveguide 52 of the wavelength conversion element 40.

The aforementioned wavelength conversion process will be described below with reference to FIG. 4. In this figure, a wavelength is plotted in the micron units against the abscissa shown in FIG. 4, similarly to FIG. 2, and the light intensity is plotted in arbitrary units against the ordinate. Furthermore, the starting point positions of the upward arrows show the wavelength center positions of the pump light (wavelength $\lambda_p$), signal light (wavelength $\lambda_s$), SH light (wavelength $\lambda_{SH}$), and DF light (converted light) with a wavelength of $\lambda_c$, and the length of the arrows reflects the relative relationship by being proportional to respective light intensity.

A second harmonic light with a wavelength $\lambda_{SH}$ of 0.77 µm is generated by the secondary nonlinear optical effect from the pump light 56 with a wavelength $\lambda_p$ of 1.54 µm. This is shown in FIG. 4 by drawing sidewise arrows from the arrows showing the pump light 56 with a wavelength $\lambda_p$ of 1.54 µm to the arrow showing the SH light with a wavelength $\lambda_{SH}$ of 0.77 µm.

Figure 4:
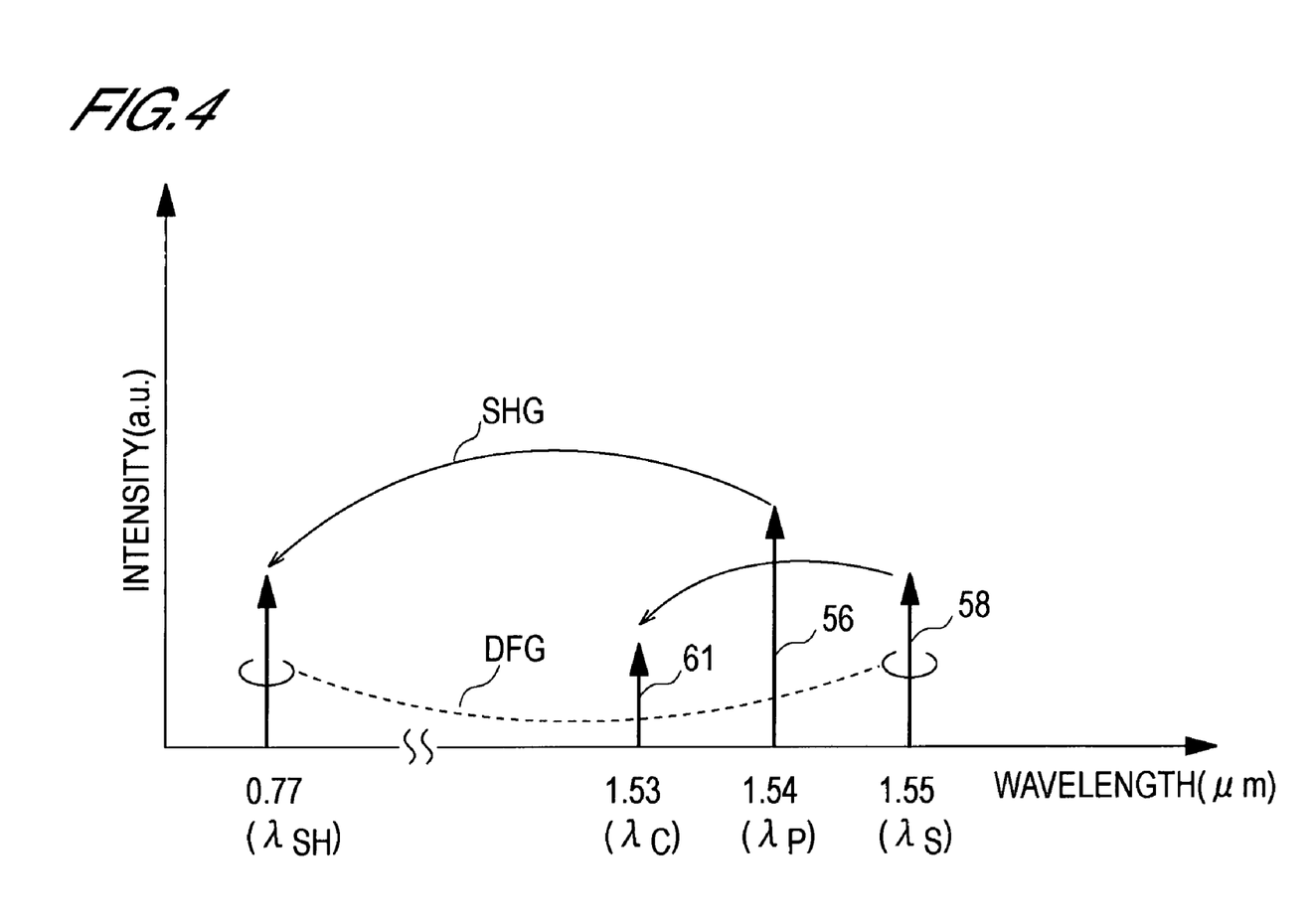
FIG. 4 illustrates the wavelength conversion process by cascade realization of second order nonlinear optical effects.

The SH light with a wavelength $\lambda_{SH}$ of 0.77 µm that was generated by the SHG and the signal light 58 with a wavelength $\lambda_s$ of 1.55 µm are shown in FIG. 4 by semicircular symbols and the broken line connecting them. This is a schematic representation of the relationship providing for the generation of the DF light with a wavelength $\lambda_c$ of 1.53 µm by a nonlinear interaction such as the DFG of the SH light and signal light 58. This result can be interpreted as a conversion of the signal light 58 with a wavelength $\lambda_s$ of 1.55 µm into a converted light with a wavelength $\lambda_c$ of 1.53 µm through the SH light and pump light 56 by realizing the SHG and DFG, which are nonlinear optical effects, in a cascade manner.

The DF light which is a new light with a wavelength $\lambda_c$ of 1.53 µm is generated by introducing the pump light 56 with a wavelength $\lambda_p$ of 1.54 µm and the signal light 58 with a wavelength $\lambda_s$ of 1.55 µm into the wavelength conversion element 40. Therefore, the outgoing light 60 from the wavelength conversion element 40 becomes a light obtained by multiplexing the pump light 56 with a wavelength $\lambda_p$ of 1.54 µm, signal light 58 with a wavelength $\lambda_s$ of 1.55 µm, SH light with a wavelength $\lambda_{SH}$ of 0.77 µm, and DF light with a $\lambda_c$ of 1.53 µm.

The outgoing light 60 is filtered with a narrow-band wavelength filter 44 and only the DF light with a wavelength $\lambda_c$ of 1.53 µm is taken out as the converted light 61. Thus, the signal light 58 with a wavelength $\lambda_s$ of 1.55 µm is wavelength converted as the DF light with a wavelength $\lambda_c$ of 1.53 µm and converted into the converted light 61 with the wavelength conversion device 62 comprising the multiplexer 42, wavelength conversion element 40, and narrow-band wavelength filter 44.

The wavelength $\lambda_p$ of the pump light used in this wavelength conversion is 1.54 µm and the wavelength $\lambda_s$ of the signal light is 1.55 µm. Therefore, the wavelength of the pump light is almost equal to the wavelength of the signal light. Therefore, an optical waveguide can be easily designed such that the pump light 56 with wavelength $\lambda_p$ of 1.54 µm and the signal light 58 with a wavelength $\lambda_s$ of 1.55 µm can be coupled into the waveguide easily and propagate in a lowest order mode.

However, as described hereinabove, because the wavelength $\lambda_p$ of the pump light is 1.54 µm and the wavelength $\lambda_s$ of the signal light is 1.55 µm, the position of the pump light with a wavelength $\lambda_p$ of 1.54 µm on the wavelength axis is between those of the signal light (wavelength $\lambda_s$ is 1.55 µm) and converted light (wavelength $\lambda_c$ is 1.53 µm). For this reason, if this method is used for optical communications, the pump light occupies at least one communication wavelength channel.

Another problem is that, as has already been mentioned, central wavelengths of the signal light spectrum and pump light spectrum differ only by 0.01 µm (=10 nm), as FIG. 4 clearly shows. Therefore, base portions of the spectra overlap and the number of channels that can be essentially used for optical communication is limited.

Furthermore, if the power of pump light is several tens of mW, the wavelength conversion efficiency (energy conversion efficiency) by the secondary nonlinear optical effects is about several percents at maximum. Thus, a substantial wavelength conversion efficiency of conversion of the signal light into the DF light becomes about one tenth of a percent because it is a product of the secondary harmonic generation efficiency (several percents) and conversion efficiency to the DF light (also several percents). Therefore, if a method is used by which the secondary nonlinear optical effects are induced to conduct wavelength conversion of the signal light, then the conversion efficiency will be about one tenth of a percent and substantially lower than the wavelength conversion efficiency of the method by which the signal light is directly converted into the DF light.

Accordingly, it is a first object of the present invention to provide a wavelength conversion element capable of converting the wavelength of a signal light with a high wavelength conversion efficiency.

Further, it is a second object of the present invention to provide a wavelength conversion element such that the wavelength of a pump light can be set to a wavelength longer or shorter than the wavelength of a plurality of signal lights and a plurality of converted lights present in the optical communication band and the wavelength band of the pump light can be set separately from the wavelength band of the signal lights and converted lights.

It is a third object of the present invention to provide a method for using the above-described wavelength conversion element.

SUMMARY OF THE INVENTION

In order to attain the above-described objects, the present invention provides a first wavelength conversion element which is a wavelength conversion element of a quasi-phase matching type comprising a polarization reversal structure for realizing the quasi-phase matching, wherein the period $\Lambda$ of the aforementioned polarization reversal structure has a value satisfying the following formulas (1), (2), (3), and (4):

$$(2\pi/\lambda_{SF})n_{SF} - (2\pi/\lambda_1)n_1 - (2\pi/\lambda_2)n_2 = 2\pi/\Lambda \quad (1)$$

$$(2\pi/\lambda_{SF})n_{SF} - (2\pi/\lambda_S)n_S - (2\pi/\lambda_C)n_C = 2\pi/\Lambda \quad (2)$$

$$1/\lambda_{SF} = 1/\lambda_1 + 1/\lambda_2 \quad (3)$$

$$1/\lambda_{SF} = 1/\lambda_S + 1/\lambda_C \quad (4)$$

$\lambda_1$ is a wavelength of a first pump light inputted in the wavelength conversion element, $\lambda_2$ is a wavelength of a second pump light inputted in the wavelength conversion element, $\lambda_S$ is a wavelength of a signal light inputted in the wavelength conversion element, $\lambda_C$ is a wavelength of a converted light inputted in the wavelength conversion element, $\lambda_{SF}$ is a wavelength of a sum frequency light of the first pump light and second pump light, $n_{SF}$ is a refractive index of the wavelength conversion element with respect to the sum frequency light of the first pump light and second pump light, $n_1$ is a refractive index of the wavelength conversion element with respect to the first pump light, $n_2$ is a refractive index of the wavelength conversion element with respect to the second pump light, $n_S$ is a refractive index of the wavelength conversion element with respect to the signal light, and $n_C$ is a refractive index of the wavelength conversion element with respect to the converted light.

Strictly speaking, Eqs. (1) and (2) cannot be satisfied simultaneously. Since $\lambda_1$, $\lambda_2$, $\lambda_C$, and $\lambda_S$ are in the same wavelength range, Eq. (2) can almost be satisfied if Eq. (1) is true.

When the first wavelength conversion element in accordance with the present invention is used, it is preferred that the first pump light, the second pump light, and the signal light be inputted to the wavelength conversion element, and the converted light be outputted from the wavelength conversion element. It is also preferred that the relation represented by the following formulas (5) and (6) be valid between the wavelength $\lambda_1$, $\lambda_2$, $\lambda_S$, and $\lambda_C$ of the first pump light, second pump light, signal light, and converted light:

$$\lambda_1 < \lambda_S < \lambda_2 \quad (5)$$

$$\lambda_1 < \lambda_C < \lambda_2 \quad (6)$$

Further, in order to attain the above-described objects, the present invention also provides a second wavelength conversion element which is a wavelength conversion element of a quasi-phase matching type comprising a polarization reversal structure for realizing the quasi-phase matching, wherein the period $\Lambda$ of the polarization reversal structure has a value satisfying the following formulas (7), (8), (9), and (10):

$$(2\pi/\lambda_{SF})n_{SF} - (2\pi/\lambda_{2j-1})n_{2j-1} - (2\pi/\lambda_{2j})n_{2j} = 2\pi/\Lambda \quad (7)$$

$$(2\pi/\lambda_{SF})n_{SF} - (2\pi/\lambda_S)n_S - (2\pi/\lambda_C)n_C = 2\pi/\Lambda \quad (8)$$

$$1/\lambda_{SF} = 1/\lambda_{2j-1} + 1/\lambda_{2j} \quad (9)$$

$$1/\lambda_{SF} = 1/\lambda_S + 1/\lambda_C \quad (10)$$

$\lambda_{2j-1}$ is a wavelength of a (2j–1)-th pump light inputted in the wavelength conversion element, $\lambda_{2j}$ is a wavelength of a 2j-th pump light inputted in the wavelength conversion element, $\lambda_S$ is a wavelength of a signal light inputted in the wavelength conversion element, $\lambda_C$ is a wavelength of a converted light inputted in the wavelength conversion element, $\lambda_{SF}$ is a wavelength of a sum frequency light of the (2j–1)-th pump light with a wavelength $\lambda_{2j-1}$ and 2j-th pump light with a wavelength $\lambda_{2j}$, $n_{SF}$ is a refractive index of the wavelength conversion element with respect to the sum frequency light of the (2j–1)-th pump light with a wavelength $\lambda_{2j-1}$ and 2j-th pump light with a wavelength $\lambda_{2j}$, $n_{2j-1}$ is a refractive index of the wavelength conversion element with respect to the (2j–1)-th pump light with a wavelength $\lambda_{2j-1}$, $n_{2j}$ is a refractive index of the wavelength conversion element with respect to the 2j-th pump light with a wavelength $\lambda_{2j}$, $n_S$ is a refractive index of the wavelength conversion element with respect to the signal light with a wavelength $\lambda_s$, $n_C$ is a refractive index of the wavelength conversion element with respect to the converted light with a wavelength $\lambda_c$, and j is a natural number from 1 to N, N is a natural number of 2 or more.

Strictly speaking, Eqs. (7) and (8) cannot be satisfied simultaneously. Since $\lambda_{2j-1}$, $\lambda_{2j}$, $\lambda_C$, and $\lambda_S$ are in the same wavelength range, Eq. (8) can almost be satisfied if Eq. (7) is true.

When the second wavelength conversion element in accordance with the present invention is used, it is preferred that 2N pump lights and the signal light be inputted in the wavelength conversion element and the converted light will be outputted from the wavelength conversion element. It is also preferred that the wavelengths $\lambda_{2N-1}, \lambda_{2N-3}, \ldots, \lambda_3, \lambda_1, \lambda_2, \lambda_4, \ldots, \lambda_{2N-2}, \lambda_{2N}, \lambda_S$ and $\lambda_C$ of the i-th pump lights (i=1, 2, . . . , 2N; N is a natural number of 2 or more) with a wavelengths $\lambda_i$ of 2N types with the aforementioned different wavelengths, signal light, and converted light be set to satisfy the relationships represented by the following formulas (11), (12) and (13):

$$\lambda_{2N-1} < \lambda_{2N-3} < \ldots < \lambda_3 < \lambda_1 < \lambda_2 < \lambda_4 < \ldots < \lambda_{2N-2} < \lambda_{2N} \quad (11)$$

$$\lambda_1 < \lambda_S < \lambda_2 \quad (12)$$

$$\lambda_1 < \lambda_C < \lambda_2 \quad (13)$$

The first wavelength conversion element in accordance with the present invention has a function of generating a sum frequency light (sometimes referred to hereinbelow as "SF light") by sum frequency generation (SFG) of the first pump light with a wavelength $\lambda_1$ and a second pump light with a wavelength $\lambda_2$, and generating a DF light (wavelength $\lambda_C$) as a converted light by DFG of the SF light and the signal light with a wavelength $\lambda_S$. Further, the wavelength $\lambda_1$ of the first pump light, wavelength $\lambda_2$ of the second pump light, and wavelength $\lambda_S$ of the signal light which is inputted in to the wavelength conversion element are set to satisfy the aforementioned formulas (1), (2), (3), and (4). The first pump light, second pump light, and signal light can be set to almost identical wavelengths. Therefore, those lights of the three types are easily designed so that they are coupled into the waveguide efficiently and propagate in a lowest order mode. As a result, a high-efficiency conversion is realized.

Further, the second wavelength conversion element in accordance with the present invention has a function of generating a SF light (wavelength $\lambda_{SF}$) of the (2j–1)-th pump light with a wavelength $\lambda_{2j-1}$ and a 2j-th pump light with a wavelength $\lambda_{2j}$, and generating a DF light (wavelength $\lambda_C$), as a converted light, of the SF light with wavelength $\lambda_{SF}$ and the signal light with a wavelength $\lambda_S$. The wavelength $\lambda_{2j-1}$ of the (2j–1)-th pump light, wavelength $\lambda_{2j}$ of the 2j-th pump light, and wavelength $\lambda_S$ of the signal light which are inputted to the second wavelength conversion element are set to satisfy the aforementioned formulas (7), (8), (9), and (10). The (2j–1)-th pump light, 2j-th pump light, and signal light can be set to almost identical wavelengths. Here, j is a natural number from 1 to N, N is a natural number of 2 or more. Therefore, those lights of the three types are easily designed so that they are coupled into the waveguide efficiently and propagate in a lowest order mode. As a result, high-efficiency conversion is realized.

Further, in the first wavelength conversion element in accordance with the present invention, the wavelengths of the first pump light with a wavelength $\lambda_1$, second pump light with a wavelength $\lambda_2$, a signal light with a wavelength $\lambda_S$, and a converted light with a wavelength $\lambda_C$ satisfy the relationships given by the aforementioned formulas (5) and (6). Therefore, the wavelength of the pump light can be set to a wavelength longer or shorter than the wavelengths of a plurality of signal lights and a wavelengths of a plurality of converted lights present in the optical communication band and the wavelength band of the pump light can be set separately from the wavelength band of the signal light and converted light.

Further, in the second wavelength conversion element in accordance with the present invention, the i-th pump light (i=1, 2 . . . , 2N; N is a natural number) of a wavelength $\lambda_i$ of 2N types with different wavelengths, the signal light with a wavelength $\lambda_S$, and the converted light with a wavelength $\lambda_C$ satisfy the relationships given by the aforementioned formulas (11), (12), and (13). Therefore, the wavelengths of the pump lights of 2N types can be set to a wavelength longer or shorter than the wavelengths of a plurality of signal lights and a wavelengths of a plurality of converted lights present in the optical communication band and the wavelength band of the pump lights of 2N types can be set separately from the wavelength band of the signal light and converted light.

Further, by contrast with the first wavelength conversion element that used a set of pump lights consisting of the first pump light with a wavelength $\lambda_1$ and a second pump light with a wavelength $\lambda_2$, the second wavelength conversion element uses N sets of pump lights consisting of a (2j–1)-th pump light with a wavelength $\lambda_{2j-1}$ and a 2j-th pump light with a wavelength $\lambda_{2j}$, therefore, the energy of the pump light can be increased accordingly. As a result, a wavelength conversion efficiency higher than that of the first wavelength conversion element can be realized.

BRIEF DESCRIPTION OF THE DRAWINGS

The foregoing and other objects, features and advantageous of the present invention will be better understood from the following description taken in connection with the accompanying drawings, in which.

DESCRIPTION OF THE PREFERRED EMBODIMENTS

The preferred embodiments of the present invention will be described hereinbelow with reference to FIGS. 5 to 8. Each figure shows an example of the configuration relating to the present invention. Cross-sectional shapes of each constituent element and mutual arrangement thereof are shown schematically, only to a degree making it possible to understand the present invention. The present invention is not limited to the examples shown in the figures. Further, specific materials and conditions are sometimes used in the explanation given below, but those materials and conditions are merely the preferred examples and are not, therefore, in any way limiting. Further, in FIG. 5 and FIG. 7, hatching is employed in respective places to show the presence of an optical waveguide or domain. Therefore, this hatching does not represent the cross-sectional shape of the three-dimensional structure.

First Embodiment

Figure 5:
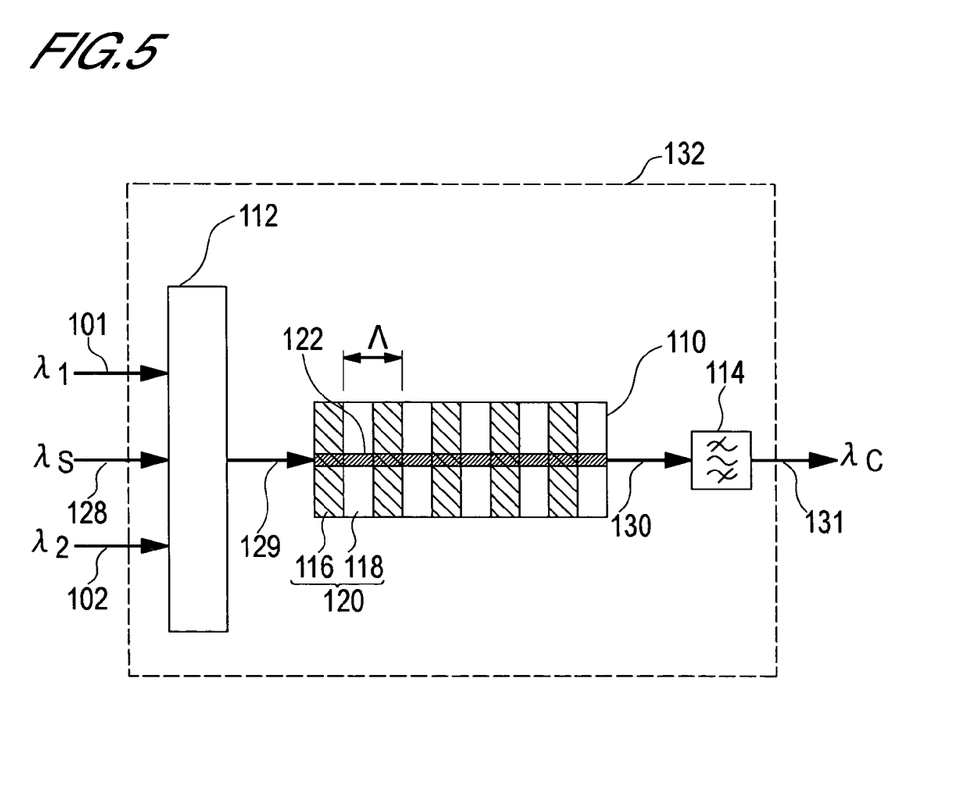
FIG. 5 is a schematic model employed for explaining the wavelength conversion device realizing wavelength conversion by using pump lights of two types.

A structure of the wavelength conversion element which can convert the wavelength of a signal light with a high conversion efficiency, can set the wavelength of a pump light to a wavelength which is longer or shorter than the wavelength of a plurality of signal lights and a plurality of conversion lights present in an optical communication band, and can set the wavelength band of the pump light separately from the wavelength band of the signal light and converted light will be described hereinbelow with reference to FIG. 5.

The first wavelength conversion element 110 which is the first embodiment of the present invention is a QPM-type wavelength conversion element comprising a periodic structure to realize the quasi-phase matching. In order to realize the wavelength conversion with the aforementioned first wavelength conversion element, the value $\Lambda$ of the period of the periodic structure of the QPM-type wavelength conversion element may be set so that the following formulas (1), (2), (3), and (4) are satisfied.

$$(2\pi/\lambda_{SF})n_{SF}-(2\pi/\lambda_1)n_1-(2\pi/\lambda_2)n_2=2\pi/\Lambda \qquad (1)$$

$$(2\pi/\lambda_{SF})n_{SF}-(2\pi/\lambda_S)n_S-(2\pi/\lambda_C)n_C=2\pi/\Lambda \qquad (2)$$

$$1/\lambda_{SF}=1/\lambda_1+1/\lambda_2 \qquad (3)$$

$$1/\lambda_{SF}=1/\lambda_S+1/\lambda_C \qquad (4)$$

Here, $\lambda_{SF}$ is a wavelength of a SF light obtained by the SFG of the first pump light with a wavelength $\lambda_1$ and second pump light with a wavelength $\lambda_2$, $n_{SF}$ is a refractive index of the QPM-type wavelength conversion element with respect to the SF light of the first pump light with a wavelength $\lambda_1$ and the second pump light with a wavelength $\lambda_2$, $n_1$ is a refractive index of the QPM-type wavelength conversion element with respect to the first pump light with a wavelength $\lambda_1$, $n_2$ is a refractive index of the QPM-type wavelength conversion element with respect to the second pump light with a wavelength $\lambda_2$, $n_S$ is a refractive index of the QPM-type wavelength conversion element with respect to the signal light with a wavelength $\lambda_S$, $n_C$ is a refractive index of the QPM-type wavelength conversion element with respect to the converted light with a wavelength $\lambda_C$.

The wavelength $\lambda_1$ of the first pump light, wavelength $\lambda_2$ of the second pump light, wavelength $\lambda_S$ of the signal light, and wavelength $\lambda_C$ of the converted light can be randomly set within a range such that value of the $\Lambda$ satisfying the conditions represented by Formulas (1) through (4) hereinabove are present as positive real numbers. Therefore, the wavelength $\lambda_1$ of the first pump light, wavelength $\lambda_2$ of the second pump light can be set outside a communication band, and the wavelength $\lambda_S$ of the signal light and wavelength $\lambda_C$ of the converted light can be set inside the communication band.

For example, in an optical communication system in which a C-band (wavelength is within a range of from 1.53 μm to 1.56 μm) of an erbium optical fiber amplifier (EDFA: Erbium-doped Fiber Amplifier) is selected as a communication band, then the wavelength $\lambda_1$ of the first pump light can be set within a region of wavelength shorter than 1.53 μm, and the wavelength $\lambda_2$ of the second pump light can be set within a region of wavelengths longer than 1.56 μm. Further, the wavelength $\lambda_S$ of the signal light and wavelength $\lambda_C$ of the converted light can be set to a wavelength of the communication band of a range from 1.53 μm to 1.56 μm.

Thus the relationship given by the following formulas (5) and (6) can be set between the wavelengths $\lambda_1$, $\lambda_2$, $\lambda_S$, and $\lambda_C$ of the first pump light, second pump light, signal light, and converted light, respectively.

$$\lambda_1<\lambda_S<\lambda_2 \qquad (5)$$

$$\lambda_1<\lambda_C<\lambda_2 \qquad (6)$$

Here, it is possible to select the value of the period $\Lambda$ of the periodic structure of the QPM-type wavelength conversion element that can wavelength convert the signal light 128 with a wavelength $\lambda_S$ of 1.55 μm into the converted light 131 with a wavelength $\lambda_C$ of 1.53 μm with the first pump light 101 having a wavelength $\lambda_1$ of 1.51 μm and the second pump light 102 having a wavelength $\lambda_2$ of 1.57 μm. Thus, a wavelength conversion element can be realized that has a function of conducting wavelength conversion to the converted light 131 with a wavelength $\lambda_C$ satisfying the following formulas (5') and (6').

$$\lambda_1(=1.51 \text{ μm})<\lambda_S(=1.55 \text{ μm})<\lambda_2(=1.57 \text{ μm}) \qquad (5')$$

$$\lambda_1(=1.51 \text{ μm})<\lambda_C(=1.53 \text{ μm})<\lambda_2(=1.57 \text{ μm}) \qquad (6')$$

The advantage obtained by using the wavelength conversion element that has a function of converting the signal light with a wavelength $\lambda_S$ satisfying the formula (5) hereinabove into the converted light with a $\lambda_C$ satisfying the formula (6) hereinabove in a wavelength conversion device used for optical communication based on the WDM or the like is that the wavelengths ($\lambda_1$ and $\lambda_2$) of the first and second pump lights can be set to a shorter wavelength and a longer wavelength, respectively, on both sides of the WDM transmission band wavelength (the signal light with a wavelength $\lambda_S$ and the converted light with a wavelength $\lambda_C$ exist in this band).

Generally the intensity of the first and second pump lights is by several orders of magnitude larger than the intensity of the signal light and converted light. For this reason, a sufficient wavelength spacing has to be between the wavelength center of the signal light and converted light and the wavelength center of the first and second pump lights. If the wavelengths ($\lambda_1$ and $\lambda_2$) of the first and second pump lights can be set to a shorter wavelength and a longer wavelength, respectively, on both sides of the WDM transmission band wavelength (the signal light with a wavelength $\lambda_S$ and the converted light with a wavelength $\lambda_C$ exist in this band), then a sufficient wavelength spacing can be taken between the wavelength center of the signal light and converted light and the wavelength center of the first and second pump lights. Thus, overlapping of the base portions of the signal light spectrum and first and second pump light spectra can be avoided. As a result, pump light is not a limitation in determining the number of channels that can be used in the WDM communication.

Here, from the formulas (3) and (4) presented hereinabove it follows that $$1/\lambda_1+1/\lambda_2=1/\lambda_S+1/\lambda_C=1/1.51+1/1.57=1/1.55+1/1.53=1/0.77.$$

Therefore, the wavelength $\lambda_{SF}$ of the SF light obtained by the SFG of the first pump light with a wavelength $\lambda_1$ (=1.51 μm) and the second pump light with a wavelength $\lambda_2$(=1.57 μm) is 0.77 μm.

Further, in case of a wavelength conversion element of an optical waveguide type which is composed by using a QPM optical waveguide, the $n_{SF}$, $n_1$, $n_2$, $n_S$, and $n_C$ that appear in the formulas (1) and (2) hereinabove are the effective refractive indexes of the QPM optical waveguide. Thus, they are the values determined by the refractive index of the LiNbO$_3$ substrate material, refractive index of the QPM optical waveguide formed on the LiNbO$_3$ substrate, and dimensions of the QPM optical waveguide.

Actually it is very difficult to find the refractive index of the QPM optical waveguide and the dimensions of the QPM optical waveguide with a degree of accuracy necessary for finding the above-mentioned $n_{SF}$, $n_1$, $n_2$, $n_S$, and $n_C$ analytically. Furthermore, even if the refractive index of the QPM optical waveguide and the dimensions of the QPM optical waveguide are found accurately, the aforementioned $n_{SF}$, $n_1$, $n_2$, $n_S$, and $n_C$ are very difficult to find analytically from those values.

Here, as a first approximation, the period $\Lambda$ of the polarization reversal structure of the QPM-type wavelength conversion element is found by employing the refractive index values of $LiNbO_3$, which is a substrate material, instead of the effective refractive index relating to the QPM optical waveguide, for the aforementioned $n_{SF}$, $n_1$, $n_2$, $n_S$, and $n_C$. Then, a plurality of QPM optical waveguides which differ by integer multiples of $\Delta\Lambda$ which is sufficiently small by comparison with the $\Lambda$ are fabricated and the value of the period of the polarization reversal structure yielding the maximum conversion efficiency is found.

Thus, a total of 2m+1 QPM optical waveguides with values of the period of the polarization reversal structure of $\Lambda \pm m\Delta\Lambda$ (m is a natural number) are fabricated under the same conditions. Then, the first pump light with a wavelength $\lambda_1$ (=1.51 μm), the second pump light with a wavelength $\lambda_2$(=1.57 μm), and the signal light with a wavelength $\lambda_S$ (=1.55 μm) are caused to fall thereon, and a waveguide in which the converted light with a wavelength $\lambda_C$ (=1.53 μm) can be obtained with maximum intensity (maximum conversion efficiency) is selected from the aforementioned 2m+1 QPM optical waveguides.

The period of the polarization reversal structure of the QPM optical waveguide that was thus selected may be set as $\Lambda$ in the formulas (1) and (2) presented hereinabove. Usually, the period of the optimum polarization reversal structure can be set by selecting about 0.1 μm as $\Delta\Lambda$, fabricating about 21 (m=10) QPM optical waveguides, and employing the period of the polarization reversal structure of the QPM optical waveguide yielding the aforementioned maximum conversion efficiency.

A wavelength conversion device composed by using the first wavelength conversion element of the first embodiment of the present invention will be described hereinabove in greater detail with reference to FIG. 5. This wavelength conversion device uses a method of generating a SF light (wavelength $\lambda_{SF}$=0.77 μm) by the SFG of the first pump light 101 with a wavelength $\lambda_1$ (=1.51 μm) and the second pump light 102 with a wavelength $\lambda_2$(=1.57 μm) and converting the signal light 128 with a wavelength $\lambda_S$ (=1.55 μm) into a converted light (DF light) having a new wavelength by the DFG of the SF light and the signal light.

The first pump light 101 with a wavelength $\lambda_1$ of 1.51 μm, the second pump light 102 with a wavelength $\lambda_2$ of 1.57 μm, and the signal light 128 with a wavelength $\lambda_S$ of 1.55 μm are multiplexed in the multiplexer 112 and introduced as an incident light 129 into a QPM optical waveguide 122 of a wavelength conversion element 110. In the QPM optical waveguide 122, a SF light with a wavelength $\lambda_{SF}$ is generated by the SFG of the first pump light 101 with a wavelength $\lambda_1$ of 1.51 μm and the second pump light 102 with a wavelength $\lambda_2$ of 1.57 μm. A DF light with a wavelength $\lambda_C$ of 1.53 μm is generated by the DFG of the SF light and the signal light 128 with a wavelength $\lambda_S$ of 1.55 μm.

Therefore, an outgoing light 130 which is outputted from the QPM optical waveguide 122 of the wavelength conversion element 110 is a light obtained by multiplexing the first pump light with a wavelength $\lambda_1$ of 1.51 μm, second pump light with a wavelength $\lambda_2$ of 1.57 μm, signal light with a wavelength $\lambda_S$ of 1.55 μm, SF light with a wavelength $\lambda_{SF}$ of 0.77 μm, and DF light with a wavelength $\lambda_C$ of 1.53 μm.

The aforementioned wavelength conversion process will be described below with reference to FIG. 6. In this figure, a wavelength is plotted in the μm units against the abscissa, similarly to FIG. 2 and FIG. 4, and the light intensity is plotted in arbitrary units against the ordinate. Furthermore, the starting point positions of the upward arrows show the wavelength center positions of the first and second pump lights, signal light, SF light, and DF light (converted light), and the length of the arrows reflects the relative relationship by being proportional to respective light intensity.

The SF light with a wavelength $\lambda_{SF}$ of 0.77 μm is generated by the SFG of the first pump light 101 with a wavelength $\lambda_1$ of 1.51 μm and the second pump light 102 with a wavelength $\lambda_2$ of 1.57 μm. This is shown in FIG. 6 by drawing sidewise arrows from the arrows showing the first pump light 101 with a wavelength $\lambda_1$ of 1.51 μm and the second pump light with a wavelength $\lambda_2$ of 1.57 μm to the arrow showing the SF light with a wavelength $\lambda_{SF}$ of 0.77 μm.

Figure 6:
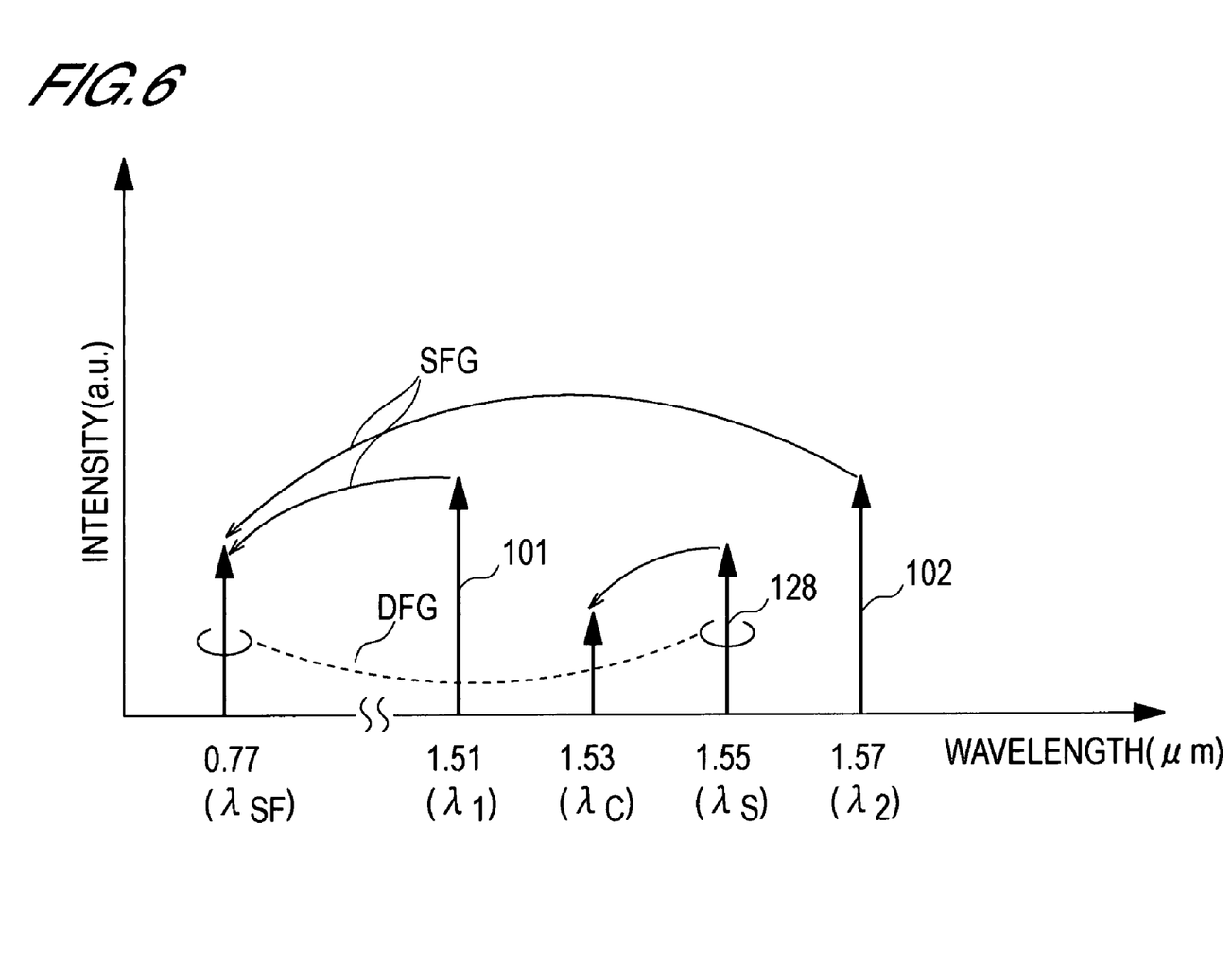
FIG. 6 illustrates the wavelength conversion process realizing wavelength conversion by using pump lights of two types.

The SF light with a wavelength $\lambda_{SF}$ of 0.77 μm and the signal light with a wavelength $\lambda_S$ of 1.55 μm are shown in FIG. 6 by semicircular symbols and the broken line connecting them. This is a schematic representation of the relationship providing for the generation of the DF light with a wavelength $\lambda_C$ of 1.53 μm by a nonlinear interaction such as DFG of the SF light and signal light. This result can be interpreted as a conversion of the signal light 128 with a wavelength $\lambda_S$ of 1.55 μm into a converted light with a wavelength $\lambda_C$ of 1.53 μm through the first and second pump lights and the SF light by the SFG, which is a nonlinear optical effect, of the first pump light and the second pump light and by inducing the DFG with the SF light generated by the SFG.

The DF light which is a new light with a wavelength $\lambda_C$ of 1.53 μm is generated by introducing the first pump light 101 with a wavelength $\lambda_1$ of 1.51 μm, the second pump light 102 with a wavelength $\lambda_2$ of 1.57 μm, and the signal light 128 with a wavelength $\lambda_S$ of 1.55 μm into the wavelength conversion element 110. Therefore, the outgoing light 130 from the wavelength conversion element 110 becomes a light obtained by multiplexing the first pump light with a wavelength $\lambda_1$ of 1.51 μm, the second pump light with a wavelength $\lambda_2$ of 1.57 μm, the signal light with a wavelength $\lambda_S$ of 1.55 μm, the SF light with a wavelength $\lambda_{SF}$ of 0.77 μm, and the DF light (converted light) with a $\lambda_C$ of 1.53 μm.

The outgoing light 130 is filtered with a narrow-band wavelength filter 114 and only the DF light with a wavelength $\lambda_C$ of 1.53 μm is taken out as the converted light 131. Thus, the signal light 128 with a wavelength of 1.55 μm is wavelength converted as the DF light with a wavelength $\lambda_C$ of 1.53 μm and converted into the converted light 131 with the wavelength conversion device 132 comprising the multiplexer 112, wavelength conversion element 110, and narrow-band wavelength filter 114.

The wavelength $\lambda_1$ of the first pump light used in this wavelength conversion is 1.51 μm, the wavelength $\lambda_2$ of the second pump light is 1.57 μm, and the wavelength $\lambda_S$ of the signal light is 1.55 μm. Therefore, the wavelengths of the first and second pump lights are almost equal to that of the signal light. Therefore, it is easy to design an optical waveguide such that the first and second pump lights and signal light can be coupled into the waveguide efficiently and propagate in a lowest order mode.

Further, the optical nonlinear coefficient relating to the appearance of SFG in a $LiNbO_3$ crystal is known to have a value which is about twice that of the optical nonlinear coefficient relating to the appearance of SHG (see, for example, Y. R. Shen "The Principle of Nonlinear Optics", John Wiley wavelength conversion element Sons Inc., 1984). The conversion efficiency from the basic wavelength in the SHG to the SH light is proportional to the product of the second power of the intensity of the basic wavelength and the second power of the optical nonlinear coefficient relating to the appearance of the SHG. Furthermore, the conversion efficiency from the lights which are to be converted in the SFG (here, the first and second pump light) to the SF light is proportional to the product of the product of the intensity of respective lights which are to be converted (here, the product of the energies of the first and second pump light) and the second power of the optical nonlinear coefficient relating to the appearance of the SFG.

The following is clear from the above with respect to the conversion efficiency from the lights which are to be converted to the converted light in wavelength conversion. When the pump lights of the same intensity are used, the optical nonlinear coefficient relating to the appearance of SFG has a value about twice that of the optical nonlinear coefficient relating to the appearance of SHG. Therefore, the intensity of the generated SH light is four times the intensity of the SF light. Therefore, if the wavelength conversion element of the first embodiment of the present invention is used, the method of wavelength conversion via the SF light is superior to the method for wavelength conversion via the SH light produced by the SHG. This is also why a high-efficiency wavelength conversion can be realized by the method described in this invention.

Furthermore, because the wavelengths of the first and second pump lights can be set to the wavelengths which are respectively shorter and longer than the WDM transmission band wavelength, it is possible to avoid the overlapping of base portions of the signal light spectrum and the first and second pump light spectra. Therefore, pump light is not a limitation in determining the number of channels that can be used in the WDM transmission.

Second Embodiment

A second wavelength conversion element which is capable of converting the wavelength of the signal light with an efficiency higher than that of the first wavelength conversion element of the first embodiment described hereinabove will be described below. Furthermore, other merits of the second wavelength conversion element, that is, the capability of setting the wavelength of the pump light to a wavelength which is longer or shorter than the wavelength of a plurality of signal lights present in the optical communication band and than the wavelength of a plurality of converted lights and the capability of setting the wavelength band of the pump light separately with respect to the wavelength band of the signal light and converted light, are identical to those of the first wavelength conversion element.

In the first wavelength conversion element, the first and second pump lights were used as the pump light. By contrast, in the second wavelength conversion element, 2N pump lights, from the first pump light to the 2N-th pump light (N is a natural number of 2 or more) are used as the pump light. Thus, the SF light with a wavelength $\lambda_{SF}$ is generated by the SFG of the first pump light and second pump light. Similarly, the SF light of a wavelength $\lambda_{SF}$ which is identical to the aforementioned wavelength is generated by the SFG of the second pump light and fourth pump light. Further, a configuration is employed in which the SF light of wavelength $\lambda_{SF}$ which is identical to the aforementioned wavelength is generated by the SFG of the (2N−1)-th pump light and 2N-th pump light. In other words, this is a configuration in which the SF light with a wavelength $\lambda_{SF}$ is generated by pump light of N sets of (2j−1)-th pump light and 2j-th pump light (j is a natural number of N or less).

In order to realize the wavelength conversion with the aforementioned second wavelength conversion element, the value $\Lambda$ of the period of the periodic structure of the QPM-type wavelength conversion element may be set so that the following formulas (7), (8), (9), and (10) are satisfied.

$$(2\pi/\lambda_{SF})n_{SF} - (2\pi/\lambda_{2j-1})n_{2j-1} - (2\pi/\lambda_{2j})n_{2j} = 2\pi/\Lambda \quad (7)$$

$$(2\pi/\lambda_{SF})n_{SF} - (2\pi/\lambda_S)n_S - (2\pi/\lambda_C)n_C = 2\pi/\Lambda \quad (8)$$

$$1/\lambda_{SF} = 1/\lambda_{2j-1} + 1/\lambda_{2j} \quad (9)$$

$$1/\lambda_{SF} = 1/\lambda_S + 1/\lambda_C \quad (10)$$

Here, $\lambda_{2j-1}$ is a wavelength of a (2j−1)-th pump light inputted in the wavelength conversion element, $\lambda_{2j}$ is a wavelength of a 2j-th pump light inputted in the wavelength conversion element, $\lambda_S$ is a wavelength of a signal light inputted in the wavelength conversion element, $\lambda_C$ is a wavelength of a converted light inputted in the wavelength conversion element, $\lambda_{SF}$ is a wavelength of a sum frequency light of the (2j−1)-th pump light with a wavelength $\lambda_{2j-1}$ and 2j-th pump light with a wavelength $\lambda_{2j}$, $n_{SF}$ is a refractive index of the wavelength conversion element with respect to the sum frequency light of the (2j−1)-th pump light with a wavelength $\lambda_{2j-1}$ and 2j-th pump light with a wavelength $\lambda_{2j}$, $n_{2j-1}$ is a refractive index of the wavelength conversion element with respect to the (2j−1)-th pump light with a wavelength $\lambda_{2j-1}$, $n_{2j}$ is a refractive index of the wavelength conversion element with respect to the 2j-th pump light with a wavelength $\lambda_{2j}$, $n_S$ is a refractive index of the wavelength conversion element with respect to the signal light with a wavelength $\lambda_S$, $n_C$ is a refractive index of the wavelength conversion element with respect to the converted light with a wavelength $\lambda_C$, and j is a natural number from 1 to N, where N is a natural number of 2 or more.

The wavelength $\lambda_{2j-1}$ of the (2j−1)-th pump light, wavelength $\lambda_{2j}$ of the 2j-th pump light, wavelength $\lambda_S$ of the signal light, and wavelength $\lambda_C$ of the converted light can be randomly set within a range such that the values of the $\Lambda$ satisfying the conditions represented by Formulas (7) through (10) hereinabove are present as positive real numbers. Therefore, the wavelength $\lambda_{2j-1}$ of the (2j−1)-th pump light and the wavelength $\lambda_{2j}$ of the 2j-th pump light can be set outside a communication band, and the wavelength $\lambda_S$ of the signal light and wavelength $\lambda_C$ of the converted light can be set inside the communication band.

Thus, in the second wavelength conversion element in accordance with the present invention, the SFG is realized and the SF light is generated with the i-th pump light (i=1, 2, . . . , 2N; N is a natural number) with a wavelength $\lambda i$ of 2N types with different wavelengths. Thus, the second wavelength conversion element can be a wavelength conversion element having a function of converting the signal light with a wavelength $\lambda_S$ into the converted light with a wavelength $\lambda_C$ satisfying the following formulas (11), (12), and (13).

$$\lambda_{2N-1} < \lambda_{2N-3} < \ldots < \lambda_3 < \lambda_1 < \lambda_2 < \lambda_4 < \ldots < \lambda_{2N-2} < \lambda_{2N} \quad (11)$$

$$\lambda_1 < \lambda_S < \lambda_2 \quad (12)$$

$$\lambda_1 < \lambda_C < \lambda_2 \quad (13)$$

Figure 7:
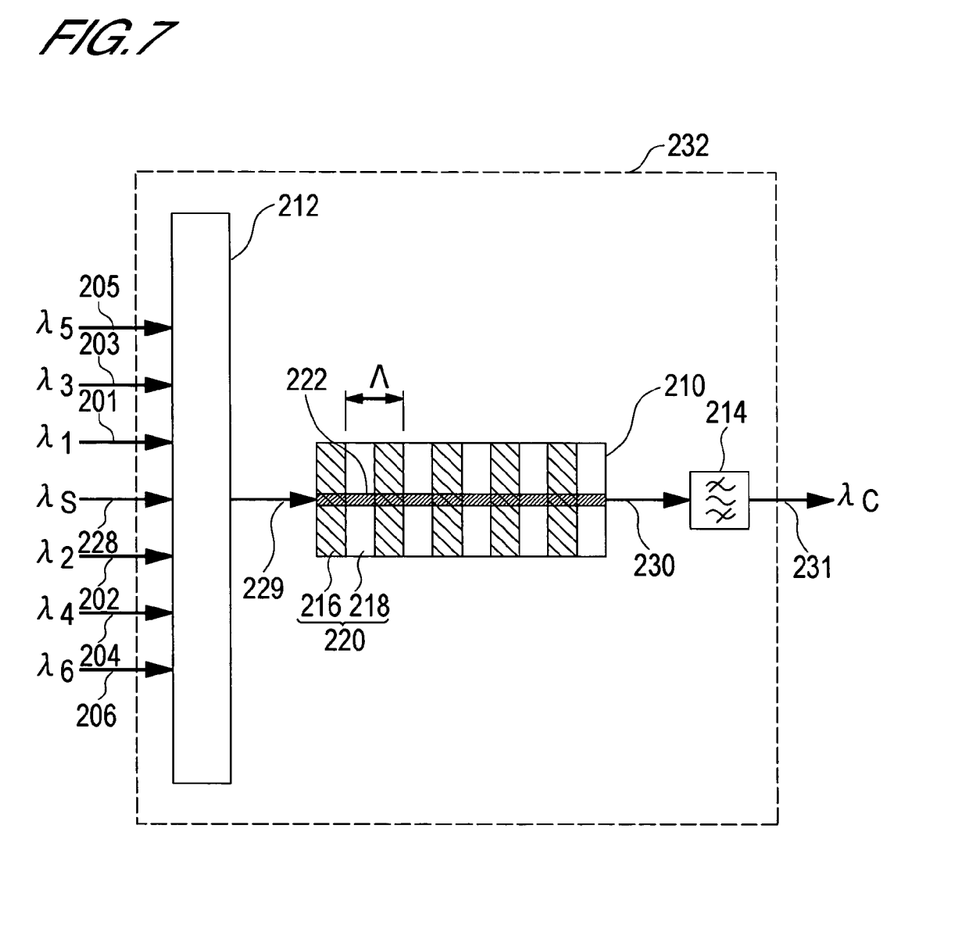
FIG. 7 is a schematic model employed for explaining the wavelength conversion device realizing wavelength conversion by using pump lights of 2N types.

The structure of the second wavelength conversion element which is the second embodiment will be described hereinbelow with reference to FIG. 7. For convenience of explanation, a case with N=3 will be considered hereinbelow, but the explanation presented hereinbelow is obviously applicable to any N.

The second wavelength conversion element 210 which is the second embodiment of the present invention is a QPM-type wavelength conversion element comprising a periodic structure realizing the quasi-phase matching. In order to realize the wavelength conversion with the aforementioned second wavelength conversion element, the value Λ of the period of the periodic structure of the QPM-type wavelength conversion element may be set to a value satisfying the following formulas (7a), (7b), (7c), (8); (9a), (9b), (9c), and (10).

$$(2\pi/\lambda_{SF})n_{SF}-(2\pi/\lambda_1)n_1-(2\pi/\lambda_2)n_2=2\pi/\Lambda \qquad (7a)$$

$$(2\pi/\lambda_{SF})n_{SF}-(2\pi/\lambda_3)n_3-(2\pi/\lambda_4)n_4=2\pi/\Lambda \qquad (7b)$$

$$(2\pi/\lambda_{SF})n_{SF}-(2\pi/\lambda_5)n_5-(2\pi/\lambda_6)n_6=2\pi/\Lambda \qquad (7c)$$

$$(2\pi/\lambda_{SF})n_{SF}-(2\pi/\lambda_S)n_S-(2\pi/\lambda_C)n_C=2\pi/\Lambda \qquad (8)$$

$$1/\lambda_{SF}=1/\lambda_1+1/\lambda_2 \qquad (9a)$$

$$1/\lambda_{SF}=1/\lambda_3+1/\lambda_4 \qquad (9b)$$

$$1/\lambda_{SF}=1/\lambda_5+1/\lambda_6 \qquad (9c)$$

$$1/\lambda_{SF}=1/\lambda_S+1/\lambda_C \qquad (10).$$

Here, $\lambda_1$ to $\lambda_6$ are the wavelengths of the first to sixth pump light, respectively, $\lambda_S$ is a wavelength of a signal light inputted in the wavelength conversion element, $\lambda_C$ is a wavelength of a first converted light inputted in the wavelength conversion element, $\lambda_{SF}$ is a wavelength (j=1, 2, 3) of a sum frequency light of the (2j-1)-th pump light with a wavelength $\lambda_{2j-1}$ and 2j-th pump light with a wavelength $\lambda_{2j}$, $n_{SF}$ is a refractive index (j=1, 2, 3) of the wavelength conversion element with respect to the a sum frequency light of the (2j-1)-th pump light with a wavelength $\lambda_{2j-1}$ and the 2j-th pump light with a wavelength $\lambda_{2j}$, $n_1$ to $n_6$ are the refractive indexes of the wavelength conversion element relating to the first to sixth pump light, respectively, $n_S$ is a refractive index of the wavelength conversion element with respect to the signal light with a wavelength $\lambda_S$, and $n_C$ is a refractive index of the wavelength conversion element with respect to the converted light with a wavelength $\lambda_C$.

For example, similarly to the above-described first wavelength conversion element, in an optical communication system in which a C-band (wavelength is within a range of from 1.53 μm to 1.56 μm) of an erbium optical fiber amplifier (EDFA: Erbium-doped Fiber Amplifier) is selected as a communication band, the wavelength $\lambda_{2j-1}$ of the (2j-1)-th pump light can be set within a region of wavelength shorter than 1.53 μm, and the wavelength $\lambda_{2j}$ of the 2j-th pump light can be set in a region of wavelengths longer than 1.56 μm. Further, the wavelength $\lambda_S$ of the signal light and wavelength $\lambda_C$ of the converted light can be set to a wavelength of the communication band of a range from 1.53 μm to 1.56 μm.

Here, it is possible to select the value Λ of the period of the periodic structure of the QPM-type wavelength conversion element that has a function of generating the SF light with a wavelength $\lambda_{SF}$ of 0.77 μm based on the SFG with the first pump light having a wavelength $\lambda_1$ of 1.51 μm, the second pump light having a wavelength $\lambda_2$ of 1.57 μm, the third pump light having a wavelength $\lambda_3$ of 1.50 μm, the fourth pump light having a wavelength $\lambda_4$ of 1.58 μm, the fifth pump light having a wavelength $\lambda_5$ of 1.49 μm, and the sixth pump light having a wavelength $\lambda_6$ of 1.59 μm.

Thus, a wavelength conversion element can be realized that has a function of conducting wavelength conversion of the signal light with a wavelength $\lambda_S$ of 1.55 μm to the converted light with a wavelength $\lambda_C$ of 1.53 μm by the DFG of the SF light with a wavelength $\lambda_{SF}$ of 0.77 μm to the signal light with a wavelength $\lambda_S$ of 1.55 μm. Thus, a wavelength conversion element can be realized that has a function of conducting wavelength conversion of the signal light with a wavelength $\lambda_S$ of 1.55 μm to the converted light with a wavelength $\lambda_C$ satisfying the following formulas (11'), (12'), and (13').

$$\lambda_5(=1.49 \text{ μm})<\lambda_3(=1.50 \text{ μm})<\lambda_1(=1.51 \text{ μm})<\lambda_2(=1.57 \text{ μm})<\lambda_4(=1.58 \text{ μm})<\lambda_6(=1.59 \text{ μm}) \qquad (11')$$

$$\lambda_1(=1.51 \text{ μm})<\lambda_S(=1.55 \text{ μm})<\lambda_2(=1.57 \text{ μm}) \qquad (12')$$

$$\lambda_1(=1.51 \text{ μm})<\lambda_C(=1.53 \text{ μm})<\lambda_2(=1.57 \text{ μm}) \qquad (13')$$

The process of realizing the SFG with six pump lights from the above-described first to sixth pump lights is equivalent to that of the case with N=3 if the aforementioned generalized representation (condition formulas (7), (9), and (11) described hereinabove) are used. Therefore, the above-described condition formula (7) corresponds to condition formulas (7a), (7b), (7c), the above-described condition formula (9) corresponds to condition formulas (9a), (9b), (9c), and the condition formula (11) corresponds to the condition formula (11'). In this connection, the first wavelength conversion element corresponds to the case with N=1.

The advantage obtained by using the wavelength conversion element that has a function of converting the signal light with a wavelength $\lambda_S$ satisfying the condition formula (12) hereinabove into the converted light with a $\lambda_C$ satisfying the condition formula (13) hereinabove in a wavelength conversion device used for the WDM communication or the like is that the wavelengths ($\lambda_1, \lambda_2, \ldots, \lambda_{2N}$) of the first through 2N-th pump lights can be set to a shorter wavelength and a longer wavelength, respectively, on both sides of the WDM transmission band wavelength (the signal light with a wavelength $\lambda_S$ and the converted light with a wavelength $\lambda_C$ are present in this band), this advantage being similar to that of the first wavelength conversion element.

The base portions of the signal light spectrum and first through 2N-th pump light spectra can be the thus prevented from overlapping. As a result, similarly to the first wavelength conversion element, pump lights will not be a limitation in determining the number of channels that can be used in the WDM communication.

Here, from the condition formulas (9a), (9b), (9c) and (10) presented hereinabove it follows that $$1/\lambda_1+1/\lambda_2=1/\lambda_3+1/\lambda_4=1/\lambda_5+1/\lambda_6=1/\lambda_S+1/\lambda_C=1/1.51+ 1/1.57=1/1.50+1/1.58=1/1.49+1/1.59=1/1.55+1/ 1.53=1/0.77.$$

Therefore, the wavelength $\lambda_{SF}$ of the SF light obtained by the SFG is 0.77 μm.

Further, in case of a QPM type wavelength conversion element of an optical waveguide type which is composed by using a QPM optical waveguide, the $n_{SF}$, $n_1$, $n_2$, $n_3$, $n_4$, $n_5$, $n_6$, $n_S$, and $n_C$ that are presented hereinabove are the effective refractive indexes of the QPM optical waveguide. Thus, they are the values determined by the refractive index of the LiNbO$_3$ substrate material, the refractive index of the QPM optical waveguide formed on the LiNbO$_3$ substrate, and the dimensions of the QPM optical waveguide. Similarly to the case of the first wavelength conversion element, it is rational to determine those values experimentally. Thus, a plurality of QPM optical waveguides with different periods of polarization reversal structure are fabricated by the same method as described hereinabove in explaining the first wavelength conversion element and the value at which the maximum conversion efficiency is attained is experimentally found as the period Λ of the polarization reversal structure of the second wavelength conversion element.

A method for conducting wavelength conversion of a signal light with a wavelength $\lambda_S$ of 1.55 μm into a converted light (DF light) with a wavelength $\lambda_C$ of 1.53 μm with the wavelength conversion device composed by using the second wavelength conversion element in accordance with the present invention will be described hereinbelow in greater detail with reference to FIG. 7

The first pump light (wavelength $\lambda_1$=1.51 μm) 201, second pump light (wavelength $\lambda_2$=1.57 μm) 202, third pump light (wavelength $\lambda_3$=1.50 μm) 203, fourth pump light (wavelength $\lambda_4$=1.58 μm) 204, fifth pump light (wavelength $\lambda_5$=1.49 μm) 205, sixth pump light (wavelength $\lambda_6$=1.59 μm) 206, and signal light 228 with a wavelength $\lambda_S$ of 1.55 μm are multiplexed with a multiplexer 212 and introduced as an incident light 229 into a QPM optical waveguide 222 of a wavelength conversion element 210.

As a result, in the QPM optical waveguide 222, a SF light with a wavelength $\lambda_{SF}$ of 0.77 μm which is obtained by the SFG is generated with the first pump light 201, second pump light 202, third pump light 203, fourth pump light 204, fifth pump light 205, and sixth pump light 206.

Therefore, an outgoing light 230 which is outputted from the QPM optical waveguide 222 of the wavelength conversion element 210 is obtained by multiplexing the first pump light, second-pump light, third pump light, fourth pump light, fifth pump light, sixth pump light, signal light with a wavelength $\lambda_S$ of 1.55 μm, SF light with a wavelength $\lambda_{SF}$ of 0.77 μm, and DF light with a wavelength $\lambda_C$ of 1.53 μm. Thus, the above-described method is a method for converting the signal light with a wavelength $\lambda_S$ of 1.55 μm into a converted light with a wavelength $\lambda_C$ satisfying the formulas (11'), (12'), and (13') presented hereinabove.

The aforementioned wavelength conversion process will be described below with reference to FIG. 8. In this figure, similarly to FIG. 2, FIG. 4, and FIG. 6, a wavelength is plotted in the μm units against the abscissa, and the light intensity is plotted in arbitrary units against the ordinate. Furthermore, the starting point positions of the upward arrows show the wavelength center positions of the first through sixth pump lights, signal light, SF light, and DF light (converted light), and the length of the arrows reflects the relative relationship by being proportional to respective light intensity.

The SF light with a wavelength $\lambda_{SF}$ of 0.77 μm is generated by the SFG of the first pump light 201 with a wavelength $\lambda_1$ of 1.51 μm and the second pump light 202 with a wavelength $\lambda_2$ of 1.57 μm. Further, the SF light with a wavelength $\lambda_{SF}$ of 0.77 μm is generated by the SFG of the third pump light 203 with a wavelength $\lambda_3$ of 1.50 μm and the fourth pump light 204 with a wavelength $\lambda_4$ of 1.58 μm. The SF light with a wavelength $\lambda_{SF}$ of 0.77 μm is generated by the SFG of the fifth pump light 205 with a wavelength $\lambda_5$ of 1.49 μm and the sixth pump light 206 with a wavelength $\lambda_6$ of 1.59 μm.

Figure 8:
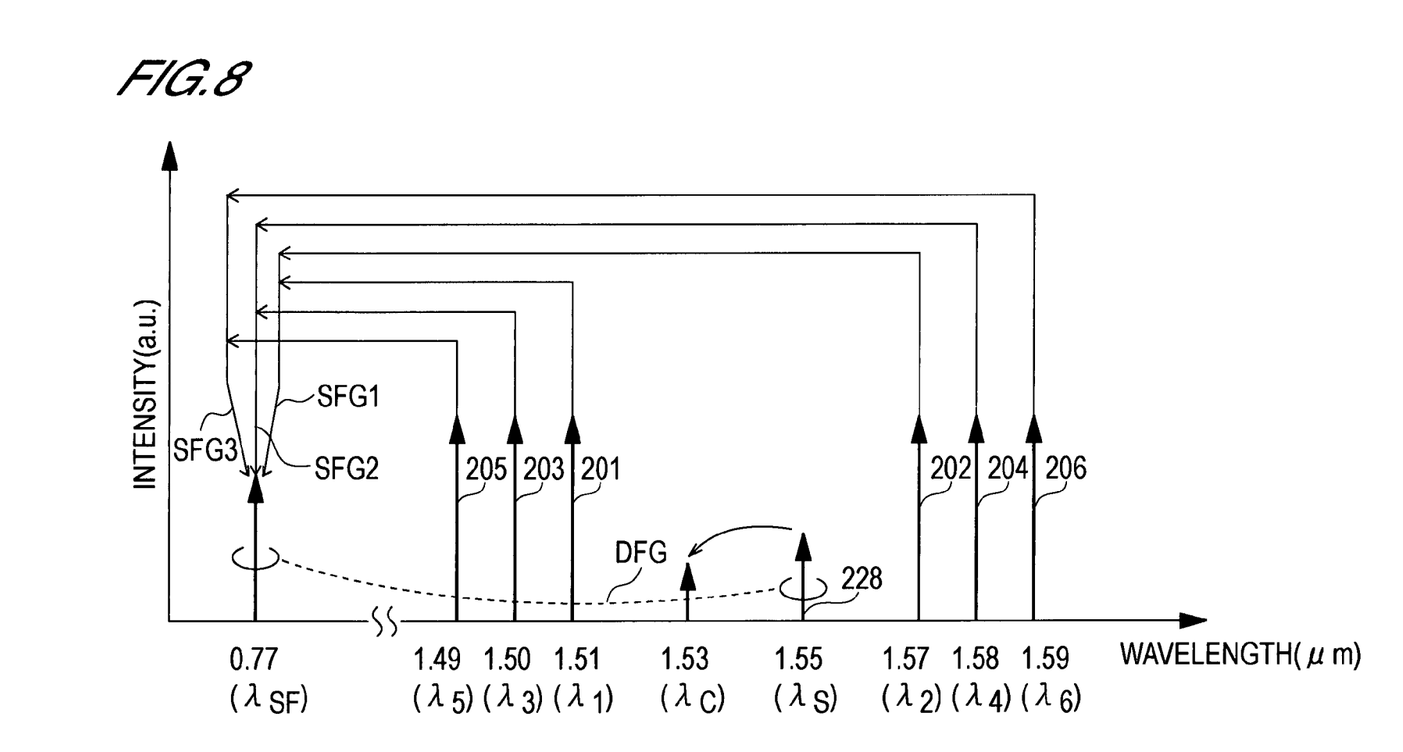
FIG. 8 illustrates the wavelength conversion process realizing wavelength conversion by using pump lights of 2N types.

This is shown in FIG. 8 by drawing sidewise arrows from the arrows showing the first pump light with a wavelength $\lambda_1$ of 1.51 μm and the second pump light with a wavelength $\lambda_2$ of 1.57 μm to the arrow showing the SF light with a wavelength $\lambda_{SF}$ of 0.77 μm, and assembling those sidewise arrows as a SFG1. Sidewise arrows are also drawn from the arrows showing the third pump light with a wavelength $\lambda_3$ of 1.50 μm and the fourth pump light with a wavelength $\lambda_4$ of 1.58 μm to the arrow showing the SF light with a wavelength $\lambda_{SF}$ of 0.77 μm, and those sidewise arrows are assembled as a SFG2. Sidewise arrows are also drawn from the arrows showing the fifth pump light with a wavelength $\lambda_5$ of 1.49 μm and the sixth pump light with a wavelength $\lambda_6$ of 1.59 μm to the arrow showing the SF light with a wavelength $\lambda_{SF}$ of 0.77 μm, and those sidewise arrows are assembled as a SFG3.

The SF light with a wavelength $\lambda_{SF}$ of 0.77 μm that was generated by adding the aforementioned SFG1, SFG2, and SFG3 and the signal light with a wavelength $\lambda_S$ of 1.55 μm are shown in FIG. 8 by semicircular symbols and the broken line connecting them. This is a schematic representation of the relationship providing for the generation of the DF light with a wavelength $\lambda_C$ of 1.53 μm by a nonlinear interaction such as DFG of the SF light and signal light. This result can be interpreted as a conversion of the signal light 228 with a wavelength $\lambda_S$ of 1.55 μm into a converted light with a wavelength $\lambda_C$ of 1.53 μm through the first to sixth pump lights and the SF light by the SFG, which is a nonlinear optical effect, of the first pump light to sixth pump light and by inducing the DFG with the generated SF light generated by the SFG.

The DF light which is a new light with a wavelength $\lambda_C$ of 1.53 μm is generated by introducing the first pump light 201 with a wavelength $\lambda_1$ of 1.51 μm, the second pump light 202 with a wavelength $\lambda_2$ of 1.57 μm, the third pump light 203 with a wavelength $\lambda_3$ of 1.50 μm, the fourth pump light 204 with a wavelength $\lambda_4$ of 1.58 μm, the fifth pump light 205 with a wavelength $\lambda_5$ of 1.49 μm, the sixth pump light 206 with a wavelength $\lambda_6$ of 1.59 μm, and the signal light 228 with a wavelength $\lambda_S$ of 1.55 μm into the wavelength conversion element 210. Therefore, the outgoing light 230 from the wavelength conversion element 210 becomes a light obtained by multiplexing the first pump light with a wavelength $\lambda_1$ of 1.51 μm, the second pump light with a wavelength $\lambda_2$ of 1.57 μm, the third pump light with a wavelength $\lambda_3$ of 1.50 μm, the fourth pump light with a wavelength $\lambda_4$ of 1.58 μm, the fifth pump light with a wavelength $\lambda_5$ of 1.49 μm, the sixth pump light with a wavelength $\lambda_6$ of 1.59 μm, signal light with a wavelength $\lambda_S$ of 1.55 μm, the SF light with a wavelength $\lambda_{SF}$ of 0.77 μm, and the DF light (converted light) with a wavelength $\lambda_C$ of 1.53 μm.

The outgoing light 230 is filtered with a narrow-band wavelength filter 214 and only the DF light with a wavelength $\lambda_C$ of 1.53 μm is taken out as the converted light 231. Thus, the signal light 228 with a wavelength $\lambda_S$ of 1.55 μm is wavelength converted as the DF light with a wavelength $\lambda_C$ of 1.53 μm and converted into the converted light 231 with the wavelength conversion device 232 comprising the multiplexer 212, wavelength conversion element 210, and narrow-band wavelength filter 214.

The wavelength $\lambda_1$ of the first pump light used in this wavelength conversion is 1.51 μm, the wavelength $\lambda_2$ of the second pump light is 1.57 μm, the wavelength $\lambda_3$ of the third pump light is 1.50 μm, the wavelength $\lambda_4$ of the fourth pump light is 1.58 μm, the wavelength $\lambda_5$ of the fifth pump light is 1.49 μm, the wavelength $\lambda_6$ of the sixth pump light is 1.59 μm, and the wavelength $\lambda_S$ of the signal light is 1.55 μm. Therefore, the wavelengths of the first through sixth pump lights are almost equal to that of the signal light. Therefore, it is easy to design an optical waveguide such that the first through sixth pump lights and signal light can be coupled into the wavelength conversion element 210 efficiently and will together propagate in a lowest order mode.

Further, by contrast with the method for wavelength conversion via the SH light created by the SHG, the method using the second wavelength conversion element of the second embodiment in accordance with the present invention conducts wavelength conversion via the SF light. Therefore, high-efficiency wavelength conversion can be realized similarly to the first wavelength conversion element of the first embodiment.

Further, because the wavelengths of the first through sixth pump lights can be set to a shorter wavelength and a longer wavelength, respectively, on both sides of the WDM transmission band wavelength, the overlapping of the base portions of the signal light spectrum and the first through sixth pump light spectra can be avoided. As a result, pump lights will not be a limitation in determining the number of channels that can be used in the WDM communication, this feature being similar to that of the first wavelength conversion element.

As described hereinabove, with the second wavelength conversion element, three sets of pump lights, first pump light and second pump light, third pump light and fourth pump light, and fifth pump light and sixth pump light, are used, by contrast with the first wavelength conversion element that used one set of the first pump light with a wavelength $\lambda_1$ and the second pump light with a wavelength $\lambda_2$. Therefore, the total intensity of pump light can be increased accordingly and thus the intensity of the SF light can be increased. As a result, a wavelength conversion efficiency higher than that of the first wavelength conversion element can be realized. In the above-described embodiment, an example was explained in which three sets of pump lights were used. However, it is generally clear that similar results are obtained if four or more sets of pump lights (there are eight types of pump lights in this case) are used.

Thus, generally N sets of pump lights, (2j−1)-th pump light with a wavelength $\lambda_{2j-1}$ and 2j-th pump light with a wavelength $\lambda_{2j}$, can be used. Here j is a natural number from 1 to N; when j=N, N sets of pump lights are used.

Further, a wavelength conversion element similar to the second wavelength conversion element of the second embodiment can be also realized by combining pump lights with a wide spectral width, that is, pump lights having spectral components over a wavelength band with a wide finite width. The reasons therefor are described below.

The second wavelength converter had a configuration in which the SF light based on the SFG was generated by combining N pump lights which are set by changing the central wavelength of the spectrum to a shorter wavelength outside the communication band and N pump lights which are set by changing the central wavelength of the spectrum to a longer wavelength outside the communication band. The set wavelength band of the central wavelength of the spectrum of pump lights that are set to a shorter wavelength outside the communication band and to a longer wavelength outside the communication band has to be a region in which the secondary nonlinear optical coefficients employed for realizing the SFG assume large values. Therefore, it has a finite bandwidth.

If we consider a limit case in which N values are increased without limitation, it will correspond to using a light having continuous spectral components over the entire wavelength band with a limited finite width as a pump light. Thus, a wavelength conversion element identical to the second wavelength conversion element can be also realized by combining pump lights having spectral components over a wavelength band with a wide finite width.

The number of pump light sets (the set value of N) or the width of spectral components and the wavelength band thereof for a pump light used for realizing the wavelength conversion are the design features that have to be determined by considering the wavelength band in which the secondary nonlinear optical effects such as DFG, SHG, and SFG will be effectively realized, the transmission characteristic of a narrow-band wavelength filter for filtering the converted light, and the like.

In order to realize effectively the secondary nonlinear optical effects, the secondary nonlinear optical coefficients of nonlinear optical crystals such as $LiNbO_3$, which are the structural components of wavelength conversion elements, have to be sufficiently large. Because the values of secondary nonlinear optical coefficients depend on wavelength, this dependence on wavelength shall be considered.

As described hereinabove, with the wavelength conversion device in accordance with the present invention, the wavelength of the pump light can be set to a wavelength longer or shorter than the wavelengths of a plurality of signal lights or a plurality of converted lights present in the optical communication band and the wavelength band of pump lights can be set with a sufficient wavelength spacing with respect to the wavelength bands of the signal lights and converted lights.

Further, the device has a function of generating a SF light by inducing the SFG of pump lights with each other and then obtaining a DF light as a converted light by inducing the DFG of the SF light and signal lights. Therefore, the pump lights and signal lights can be easily designed so as to coupled into the waveguide efficiently and propagate in the optical waveguide in a lowest-order mode. As a result, high-efficiency conversion is realized.

Further, if the number of types of pump lights is increased, the intensity of the SF light generated by the SFG of pump lights with each other will be increased and even higher wavelength conversion efficiency can be obtained.

In the first and second embodiments, the explanation was conducted with respect to an optical communication system in which the C band of EDFA served as a communication band, but in principle the wavelength conversion can be realized in any wavelength band depending on what wavelength of pump light is set.

Further, in the above-described embodiments, the explanation was conducted with respect to a QPM-type wavelength conversion element having a waveguide using $LiNbO_3$ crystals, but a QPM-type wavelength conversion element having a similar waveguide can be also fabricated by forming a periodic structure realizing the QPM in GaAs and InP crystals which are semiconductors.

What is claimed is:

1. A wavelength conversion element having a periodic structure for demonstrating quasi-phase matching, with a period $\Lambda$ thereof being set to a value satisfying the following formulas (1), (2), (3), and (4):

$$(2\pi/\lambda_{SF})n_{SF}-(2\pi/\lambda_1)n_1-(2\pi/\lambda_2)n_2=2\pi/\Lambda \qquad (1)$$

$$(2\pi/\lambda_{SF})n_{SF}-(2\pi/\lambda_S)n_S-(2\pi/\lambda_C)n_C=2\pi/\Lambda \qquad (2)$$

$$1/\lambda_{SF}=1/\lambda_1+1/\lambda_2 \qquad (3)$$

$$1/\lambda_{SF}=1/\lambda_S+1/\lambda_C \qquad (4),$$

in which:

$\lambda_1$ is a wavelength of a first pump light inputted in the wavelength conversion element;

$\lambda_2$ is a wavelength of a second pump light inputted in the wavelength conversion element;

$\lambda_S$ is a wavelength of a signal light inputted in the wavelength conversion element;

$\lambda_C$ is a wavelength of a converted light inputted in the wavelength conversion element;

$\lambda_{SF}$ is a wavelength of a sum frequency light of the first pump light and second pump light;

$n_{SF}$ is a refractive index of the wavelength conversion element with respect to the sum frequency light of the first pump light and second pump light;

$n_1$ is a refractive index of the wavelength conversion element with respect to the first pump light;

$n_2$ is a refractive index of the wavelength conversion element with respect to the second pump light;

$n_S$ is a refractive index of the wavelength conversion element with respect to the signal light; and $n_C$ is a refractive index of the wavelength conversion element with respect to the converted light.

2. The wavelength conversion element according to claim 1, wherein the relation represented by the following formulas (5) and (6) is valid between the wavelength $\lambda_1$ of the first pump light, wavelength $\lambda_2$ of the second pump light, wavelength $\lambda_S$ of the signal light, and wavelength $\lambda_C$ of the converted light:

$$\lambda_1 < \lambda_S < \lambda_2 \quad (5)$$

$$\lambda_1 < \lambda_C < \lambda_2 \quad (6).$$

3. A method for using the wavelength conversion element, wherein the first pump light with a wavelength $\lambda_1$, the second pump light with a wavelength $\lambda_2$, and the signal light with a wavelength $\lambda_S$ are inputted to the wavelength conversion element described in claim 1, and the converted light with a wavelength $\lambda_C$ is outputted therefrom.

4. A wavelength conversion element having a periodic structure for demonstrating quasi-phase matching, with a period $\Lambda$ thereof being set to a value satisfying the following formulas (7), (8), (9), and (10):

$$(2\pi/\lambda_{SF})n_{SF} - (2\pi/\lambda_{2j-1})n_{2j-1} - (2\pi/\lambda_{2j})n_{2j} = 2\pi/\Lambda \quad (7)$$

$$(2\pi/\lambda_{SF})n_{SF} - (2\pi/\lambda_S)n_S - (2\pi/\lambda_C)n_C = 2\pi/\Lambda \quad (8)$$

$$1/\lambda_{SF} = 1/\lambda_{2j-1} + 1/\lambda_{2j} \quad (9)$$

$$1/\lambda_{SF} = 1/\lambda_S + 1/\lambda_C \quad (10),$$

in which:

$\lambda_{2j-1}$ is a wavelength of a $(2j-1)$-th pump light inputted in the wavelength conversion element;

$\lambda_{2j}$ is a wavelength of a $2j$-th pump light inputted in the wavelength conversion element;

$\lambda_S$ is a wavelength of a signal light inputted in the wavelength conversion element;

$\lambda_C$ is a wavelength of a converted light inputted in the wavelength conversion element;

$\lambda_{SF}$ is a wavelength of a sum frequency light of the $(2j-1)$-th pump light and $2j$-th pump light;

$n_{SF}$ is a refractive index of the wavelength conversion element with respect to the sum frequency light of the $(2j-1)$-th pump light and $2j$-th pump light;

$n_{2j-1}$ is a refractive index of the wavelength conversion element with respect to the $(2j-1)$-th pump light;

$n_{2j}$ is a refractive index of the wavelength conversion element with respect to the $2j$-th pump light;

$n_S$ is a refractive index of the wavelength conversion element with respect to the signal light;

$n_C$ is a refractive index of the wavelength conversion element with respect to the converted light; and $j$ is a natural number from 1 to N, N is a natural number of 2 or more.

5. The wavelength conversion element according to claim 4, wherein the relation represented by the following formulas (11), (12) and (13) is valid between the wavelength $\lambda_{2N-1}$ of the $(2N-1)$-th pump light, $\lambda_{2N-3}$ of the $(2N-3)$-th pump light, $\lambda_3$ of the third pump light, $\lambda_1$ of the first pump light, $\lambda_2$ of the second pump light, $\lambda_4$ of the fourth pump light, $\lambda_{2N-2}$ of the $(2N-2)$-th pump light, $\lambda_{2N}$ of the $2N$-th pump light, $\lambda_S$ of the signal light, and $\lambda_C$ of the converted light:

$$\lambda_{2N-1} < \lambda_{2N-3} < \ldots < \lambda_3 < \lambda_1 < \lambda_2 < \lambda_4 < \ldots \lambda_{2N-2} < \lambda_{2N} \quad (11)$$

$$\lambda_1 < \lambda_S < \lambda_2 \quad (12)$$

$$\lambda_1 < \lambda_C < \lambda_2 \quad (13).$$

6. A method for using the wavelength conversion element, wherein the $(2N-1)$-th pump light with a wavelength $\lambda_{2N-1}$, $(2N-3)$-th pump light with a wavelength $\lambda_{2N-3}$, ..., third pump light with a wavelength $\lambda_3$, first pump light with a wavelength $\lambda_1$, second pump light with a wavelength $\lambda_2$, fourth pump light with a wavelength $\lambda_4$, ..., $(2N-2)$-th pump light with a wavelength $\lambda_{2N-2}$, $2N$-th pump light with a wavelength $\lambda_{2N}$, and the signal light with a wavelength $\lambda_S$ are inputted to the wavelength conversion element described in claim 4, and the converted light with a wavelength $\lambda_C$ is outputted therefrom.

* * * * *